United States Patent [19]
Okamoto et al.

[11] Patent Number: 5,248,133
[45] Date of Patent: Sep. 28, 1993

[54] MULTIDIMENSIONAL DAMPING APPARATUS

[75] Inventors: Osamu Okamoto, Higahiyamato; Teruomi Nakaya, Machida; Seizo Suzuki, Mitaka; Naoaki Kuwano, Chofu; Kenji Ogimoto, Kakamigahara; Ryuji Sakata, Kakamigahara; Yasuaki Taniguchi, Kakamigahara; Hiroyoshi Tanaka; Goji Iba, both of Toyama, all of Japan

[73] Assignee: National Aerospace Laboratory of Science & Technology Agency, Tokyo, Japan

[21] Appl. No.: 859,813

[22] Filed: Mar. 30, 1992

[30] Foreign Application Priority Data

Apr. 1, 1991 [JP] Japan ................................. 3-92591

[51] Int. Cl.$^5$ .............................................. F16F 7/00
[52] U.S. Cl. .................................... 267/136; 267/150; 188/161
[58] Field of Search ............... 267/136, 150; 188/161, 188/164; 74/571 R, 571 M; 310/114, 115, 117, 90.5, 83, 156

[56] References Cited

U.S. PATENT DOCUMENTS

4,749,898   6/1988   Suzuki et al. .................. 310/114
5,005,786   4/1991   Okamoto et al. ............... 244/161

Primary Examiner—Robert J. Oberleitner
Assistant Examiner—Lee W. Young
Attorney, Agent, or Firm—Armstrong, Westerman, Hattori, McLeland & Naughton

[57] ABSTRACT

A plurality of eccentric rotors are rotatably fitted between a fixed base and an output shaft on which an object to be vibrationproofed is mounted, the output shaft being supported movably in 3 to 6 Degree-of-Freedom, magnet spring mechanisms are provided on fitted wall surfaces between the fixed base and the eccentric rotor, a composite vibrationproof adjusting spring is provided between the fixed base and the output shaft, the magnet spring mechanism responding to a fine displacement of the output shaft, and in a case where the output shaft is greatly displaced, the output shaft is braked so as to be restored to a predetermined position by the composite vibrationproof adjusting spring mechanism. The magnet spring mechanism produces a large braking force since a rotational angle is large and a rotational-angle speed is high due to eccentricity of eccentric rotors.

11 Claims, 9 Drawing Sheets

MAGNETIC FLUX DENSITY

FIG. 10-B

DERIVATIVE OF THE MAGNETIC FLUX DENSITY

MAGNETIC FLUX DENSITY

FIG. 15-B

DERIVATIVE OF THE MAGNETIC FLUX DENSITY

FIG. 16

MULTIDIMENSIONAL DAMPING APPARATUS

BACKGROUND OF THE INVENTION

(1) Field of the Invention

The present invention relates to a multidimensional damping apparatus which can be applied to vibrationproof apparatuses for various objects such as vibrationproofing of pipings, and particularly to a multidimensional damping apparatus which utilizes a magnet spring mechanism.

(2) Description of the Prior Art

As damping apparatuses, various one-dimensional damping apparatuses using vibrationproof functioning materials such as a spring system such as a coil spring, an air spring, rubber, etc., a fluid system such as oil, water, air, etc., a magnet system and the like have been heretofore developed and used. For unidirectional vibrations, these conventional apparatuses exhibit the braking function according to the performance of the respective vibrationproof functioning materials to perform the function as a damper whereas for multidimensional vibrations, they cannot perform effective braking. For vibrationproofing of multidimensional vibration, there has been generally employed a method in which individual vibrationproof functioning materials are arranged in respective directions of X-Y-Z coordinate systems to individually brake vibration components in the respective directions. However, in this case, the method can response to every component of vibration but is difficult to effect a composite motion so as to be able to accurately correspond to the multidimensional vibration as the whole damping apparatus. A damping apparatus capable of accurately following the multidimensional vibration to effectively prevent the vibration has not yet been proposed.

The conventional damping apparatus is based on the one-dimensional braking as described above. An object to be vibrationproofed i& supported by a movable part of the damping apparatus, and when a vibration occurs, the apparatus follows the movement thereof to damp the vibration. Accordingly, there was a disadvantage in that in order to follow a fine vibration to exhibit the braking function, the damping apparatus is required to have a preciseness to an extent as so required, and accurate response is difficult to make and in addition manufacturing of apparatus is also difficult, resulting in a high cost. For example, in case of a magnet damper, in order to enhance the damping effect with respect to fine vibrations, a magnetic circuit section in which a damping force is generated by magnetic action of an eddy current and a flux has to be miniaturized, which involves a difficulty of working and rapidly increases the manufacturing cost. Various methods for enhancing the damping effect without miniaturizing the magnetic circuit section in the magnet damper have been heretofore proposed (for example, JPA 50-10934 and the like). However, these proposals are not different in a basical construction in which a movable part of the damper is mounted on an article which is an object to be vibrationproofed, and therefore there is a limitation in their effect.

Furthermore, the conventional damping apparatus is designed selecting functional materials which effectively act on the basis of the magnitude of vibrations. It is difficult for such damping apparatus as described above to effectively vibrationproof vibrations having a wide range of amplitudes from a fine vibration to a large vibration.

In the conventional damping mechanism, since a damper directly moves in a vibrating direction, a restoring force corresponding to vibration energy is required. In a case where an object is heavy and large in amplitude, a large restoring force is required. For example, in case of a damping mechanism in which a heavy article is supported by vibrationproof rubber, when the amplitude exceeds a predetermined limit, the mechanism cannot follow it, failing to be restored automatically.

SUMMARY OF THE INVENTION

An object of the present invention is to provide a multidimensional damping apparatus in which a movable part of a damping apparatus can follow vibration of an object to be vibrationproofed to effect a composite motion and which is excellent in responsiveness to effectively vibrationproof multidimensional vibrations.

Another object of the present invention is to provide a multidimensional damping apparatus which can enlarge a fine vibration of an object to be vibrationproofed to a large displacement of a movable part of a damping apparatus, which can accurately vibrationproof even a fine vibration, and which is low in manufacturing cost.

A further object of this invention is to provide a multidimensional damping apparatus in which a wide range of vibrations from a fine vibration to a large vibration can be positively vibrationproofed by a single apparatus.

A further object of this invention is to provide a multidimensional damping apparatus in which a vibration energy is divided into a plurality of turning forces of a rotor, even a large vibration energy can be positively absorbed and restored by a relatively small apparatus, only a magnetic force of a permanent magnet is used as power requiring no engery cost, maintenance and management are simple and running cost is low.

For achieving the aforesaid objects, a multidimensional damping apparatus according to the present invention comprises a fixed base and an output shaft assembly for mounting an object to be vibrationproofed, characterized in that a plurality of eccentric rotors are rotatably fitted through bearings between said fixed base and said output shaft, said output shaft capable of effecting free displacement within at least a two-dimensional plane with respect to said fixed base and free rotation about an axis, magnet spring mechanisms are provided on opposed fitted wall surfaces between said fixed base and said eccentric rotor and between eccentric rotors, a composite vibrationproof adjusting spring is provided between said fixed base and an object to be vibrationproofed, and the output shaft is braked so as to restore the output shaft to its initial position by said magnet spring mechanism and said composite vibrationproof adjusting spring mechanism with respect to the displacement of said output shaft.

As the aforementioned bearings, suitable bearings such as conventional ball bearings can be employed. However, by employing self-aligning bearings, it is possible to easily follow even vibrations having an inclination with respect to the axis between the bearings.

The aforementioned output shaft is composed of a spring-supported rotor and a mounting shaft fitted in and supported on said spring-supported rotor through a linear bearing whereby the output shaft can be displaced even in an axial direction and in addition can cope with the supporting of an object to be vibrationproofed which displaces in an axial direction.

The aforementioned magnet spring mechanism can employ various forms in that a high permeability pole-tooth type ring formed of a high permeability material is provided on the stator side and permanent magnets are arranged in equal pitch and in a ring-like manner on the rotor side so that the permanent magnets are opposed to pole teeth of the high permeability pole-tooth type ring; that permanent magnets are arranged on the stator side and on the rotor side so that the permanent magnets are disposed in equal pitch and whose different poles are opposed; and that an electromagnetic coil is arranged between the permanent magnets on either stator side or rotor side, said electromagnetic coil using a magnetic material positioned between said magnets as a core, and a load is connected to said coil so that the load can be switched and adjusted.

The aforementioned magnet spring mechanism has a magnet spring adjusting mechanism so that a braking torque can be adjusted. The magnet spring adjusting mechanism has its fundamental form in which a ring-like magnetic shield plate formed of a high permeability material is arranged so that the magnetic shield plate can be moved in and out of a clearance between the rotor and the stator. According to a further form of the magnetic shield plate, it has a height about twice of that of the permanent magnet arranged on the stator side or rotor side and a narrow good conductor material is arranged at a lower half portion thereof with a phase deviated from a magnet pitch so as to be positioned between the permanent magnets to thereby enhance the damping effect with respect to vibrations from a fine vibration to a vibration having a large amplitude. A rotational angle detection sensor is mounted on the stator side opposed to the permanent magnet on the rotor side of the magnet spring mechanism to thereby insert and control the magnetic shield plate and provide the active function.

Furthermore, the fixed base, the eccentric rotors, the output shaft and the magnet spring mechanism are axially divided into two or more so that they can be assembled whereby objects to be vibrationproofed such as lengthy pipes already subjected to piping, shafts and the like can be supported by the multidimensional damping apparatus which extends therethrough.

In the case where the multidimensional damping apparatus constructed as described above has two eccentric rotors, for example, let La and Lb be the eccentricities of a first eccentric rotor and a second eccentric rotor, respectively, then the center of the output shaft can freely displace within the two-dimensional plane in a circle having the radius La+Lb due to the composite motion resulting from the rotation of two eccentric rotors. Since the output shaft is rotatably supported on the second eccentric rotor, the displacement within the two-dimensional plane and the rotation about the axis can be simultaneously carried out. Furthermore, if the output shaft is composed of a spring support rotor and a mounting shaft fitted in and supported on said spring support rotor through a linear bearing, it can cope with the axial displacement. If the rotors are to be supported through self-aligning bearing, they can follow the axial inclination.

For example, in the case where the magnet spring mechanism is composed of permanent magnets on the rotor side and ring-like pole teeth formed of a high permeability material on the stator side, when the output shaft and the eccentric rotors are rotated and displaced with respect to the mounting base on which the eccentric rotors are supported or the eccentric rotors, a pulse-like braking torque is generated in the rotor due to the eddy current loss within the stator caused by the magnetic flux produced by the permanent magnets on the rotor side to exhibit the function as a damper. Particularly, in the present invention, the vibration of the object to be vibrationproofed is converted into a large angle of rotation and rotational speed of the eccentric rotor, and the magnet spring mechanism is provided in the outer peripheral portion of the eccentric rotor. Therefore, a large braking force is produced, and braking of a fine vibration can be effectively attained. A pitch between magnets can be increased as compared with the case where a movable part is directly mounted on an object to be vibrationproofed. A fine vibration can be easily handled, and the manufacturing cost can be reduced. In the case where magnets are arranged on the rotor side as well as on the stator side, the braking torque becomes further larger than that of the above-mentioned case, and the damping action with respect to the fine vibration is further enhanced.

On the other hand, the composite vibrationproof adjusting spring functions to always restore the output shaft to its initial position. When the eccentric rotor generates a large vibration enough to produce rotation over several teeth of the magnet spring, the composite vibrationproof adjusting spring is effectively actuated to suppress the vibration of the output shaft to restore the latter to its initial position. In this case, the vibration of the object to be vibrationproofed is converted into the rotational motion of the eccentric rotor, and therefore, the output shaft is easily restored with a very small restoring force. In this case, a retaining force of the magnet spring is weakened by insertion of the magnetic shield plate, and the output shaft is promptly restored to its initial position by the force of the composite vibrationproof adjusting spring. Accordingly, according to the present invention, vibrations from a fine vibration to a large vibration can be effectively isolated.

When the shield plate is designed as in claim 8, the braking torque can be adjusted by controlling the movement of the shield plate into and out of a clearance between the stator and the rotor to effectively isolate vibrations from a fine vibration to a large vibration. The rotational angle detection sensor is provided on the stator side-opposed to the permanent magnet of the rotation mechanism whereby the angle of rotation and rotational speed of the rotor can be detected, and at the same time, the active function capable of inserting and controlling the magnetic shield plate can be provided.

BRIEF DESCRIPTION OF THE DRAWINGS

FIGS. 9-A to 9-D are respectively schematic views developed to a plan for explanation of operation of a magnet spring mechanism. FIG. 9-A shows the state in which a rotor is in an initial position; FIG. 9-B shows the state in which the rotor is deviated by ¼ pitch from the initial position; FIG. 9-C shows the state in which a shield plate is moved down and corresponds to FIG. 9-A; and FIG. 9-D shows the state in which the shield plate is moved down and corresponds to FIG. 9-B.

FIG. 10-A is a graph showing the change of the relationship between the displacement of the rotor and the magnetic flux density in the magnet spring mechanism in FIG. 3; and FIG. 10-B is a graph showing the change of the derivative of the magnetic flux density.

FIG. 13-A is a sectional view of a shield plate taken on B—B of FIG. 12; and FIG. 13-B is a sectional view taken on C—C of FIG. 13-A.

FIGS. 14-A to 14-E are respectively schematic views developed to a plan for explanation of operation of a magnet spring mechanism in FIG. 13. FIG. 14-A shows the state in which the rotor is in an initial state when a shield plate is not inserted between permanent magnets; FIG. 14-B shows the state in which the rotor is deviated by ¼ pitch from the initial position; FIG. 14-C shows the state in which a portion b of the shield plate is inserted between the permanent magnets and corresponds to FIG. 14-A; FIG. 14-D shows the state similar to the above and corresponds to FIG. 14-B;-and FIG. 14-E shows the state in which a portion a of the shield plate is inserted between the permanent magnets and corresponds to FIG. 14-A.

FIG. 15-A is a graph showing the change of the relationship between the displacement of the rotor and the magnetic flux density in the magnet spring mechanism in FIG. 12; and FIG. 15-B is a graph showing the relationship between the displacement of the rotor and the derivative of the magnetic flux density in the magnet spring mechanism in FIG. 12.

DESCRIPTION OF THE PREFERRED EMBODIMENTS

Figure 1:
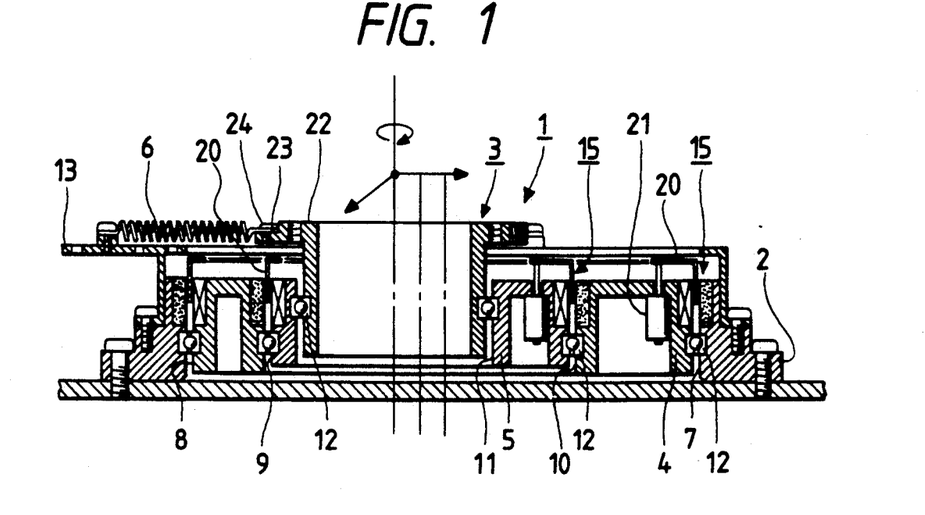
FIG. 1 is a longitudinal sectional view of an embodiment of a multidimensional damping apparatus according to the present invention.
Figure 2:
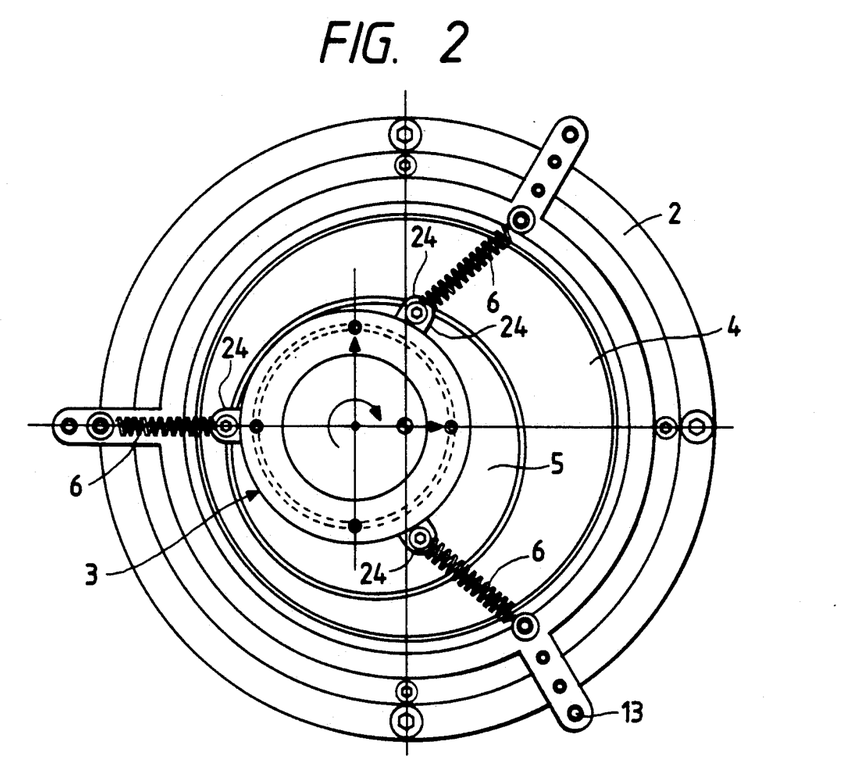
FIG. 2 is a plan view of the apparatus.

FIG. 1 and FIG. 2 schematically show a multidimensional damping apparatus according to the present embodiment. The entire construction of the apparatus is as follows. A first eccentric rotor 4 and a second eccentric rotor 5 are combined in order between a cylindrical mounting base 2 and an output shaft 3, a magnet spring mechanism 15 is provided therebetween, and a composite vibrationproof adjusting spring 6 is provided between the output shaft 3 and the mounting base 2. The output shaft can be placed in two-dimensional free displacement with respect to the fixed mounting base 2 by combination of rotations of the eccentric rotors, and the vibration of an object to be vibrationproofed supported on the output shaft is passively damped by the braking with respect to a fine displacement of the rotors caused by the magnet spring and the braking function of a large displacement by the composite vibrationproof adjusting spring 6.

The mounting base 2 has a cylindrical inner wall 7, and each of the rotors has cylindrical outer walls 8 and 9 and cylindrical inner walls 10 and 11 at eccentric position. The first eccentric rotor 4, the second eccentric rotor 5 and the output shaft 3 are rotatably fitted in and supported through self-aligning bearings 12 within the cylindrical inner wall 7 of the mounting base 2, the cylindrical inner wall 10 of the first eccentric rotor and the cylindrical inner wall 11 of the second eccentric rotor, respectively. Magnet spring mechanisms 15 are respectively provided between wall surfaces of the mounting base 2 and the eccentric rotor 4, and the first eccentric rotor 4 and the second eccentric rotor 5.

Figure 3:
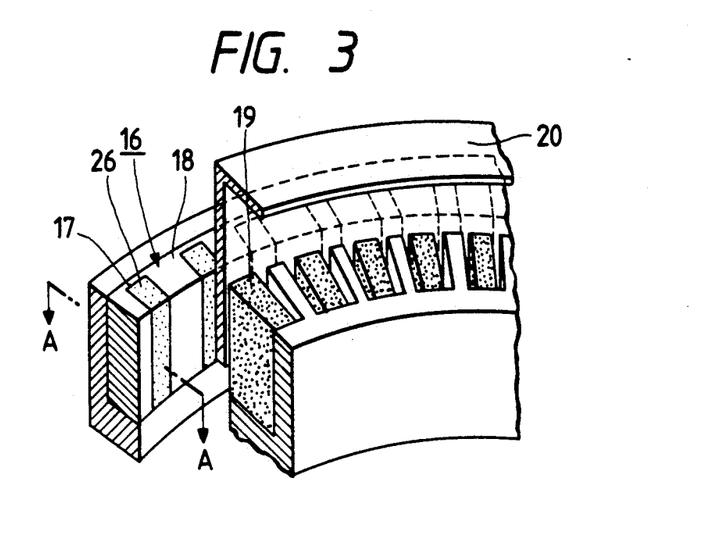
FIG. 3 is a perspective view of essential parts of a magnet spring mechanism.
Figure 4:
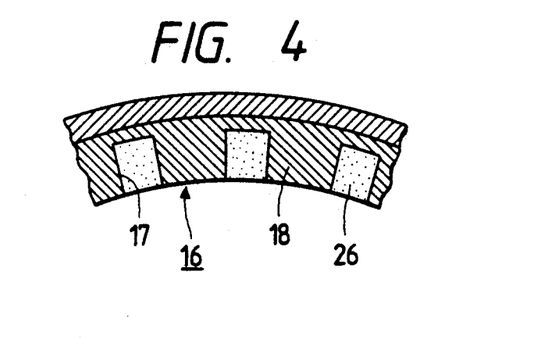
FIG. 4 is a sectional view taken on A—A of FIG. 3.

As clearly shown particularly in FIG. 3 and FIG. 4, the magnet spring mechanism 15 is formed of a high permeability material such as mild iron. A high permeability pole-tooth type ring 16 formed with pole teeth 18 by slits 17 of equal pitch is provided on the stator side (the mounting base and the cylindrical inner wall of the eccentric rotor), and permanent magnets 19 opposed to the pole teeth 18 and at equal pitch are arranged in a ring-like manner on the rotor side (the cylindrical outer wall of the eccentric rotor). A magnet spring constant adjusting mechanism provided with a ring-like magnetic shield plate 20 formed of a high permeability magnetic material to be moved in and out by a suitable actuator 21 (FIG. 1) such as a cylinder device is arranged in a gap portion between the permanent magnet 19 and the high permeability tooth-type ring 16 so that the spring constant of the magnet spring mechanism can be suitably adjusted. The slit 17 may be a mere slit. In the present embodiment, however, a good conductor material 26 such as copper is embedded in the slit and short-circuited to short-circuit an eddy current so as to enhance a damping force. The magnet spring constant adjusting mechanism is set in advance so that the mechanism is automatically actuated when a vibration exceeds a predetermined level. In the present embodiment, a rotational angle detection sensor 27 (FIG. 9) such as a hole element is provided on the stator side opposed to the permanent magnet in order to automatically detect the fact that the vibration exceeds a predetermined level. The rotational angle detection sensor is provided on the lowermost side of the stator so as not to be affected by the function of the shield plate and embedded in a direction perpendicular to the magnetic line of force. The rotational angle detection sensor 27 generates a step signal when the rotor rotates to apply a large disturbance (vibration) to the output shaft, and when the number of signals and intervals of signal reach a predetermined value, an actuator for driving a magnetic shield plate is driven and controlled. If a fuzzy control law is used as a control law, an inexpensive system results.

Three composite vibrationproof adjusting springs 6 are provided at intervals of 120 degrees between the output shaft 3 and the mounting base 2 as shown in FIG. 2, the output shaft 3 is always urged to return it to an initial position (position of axis) by the resultant force of tensions of these springs. In the present embodiment, a plurality of spring adjusting tapped holes 13 whose distances to a diametrically central part are different are provided on the base 2 so that the spring force can be adjusted.

The output shaft 3 is composed of a cylindrical spring support rotor 22 which is rotatably fitted in the cylindrical inner wall 11 of the second eccentric rotor 5 through the self-aligning bearing 12. The rotor 22 is provided at the end with a mounting flange 23 for mounting an object to be vibrationproofed and is provided in the outer peripheral portion with spring mounting portions 24 for mounting one end of the composite vibrationproof adjusting spring 6 at intervals of 120 degrees.

Figure 5:
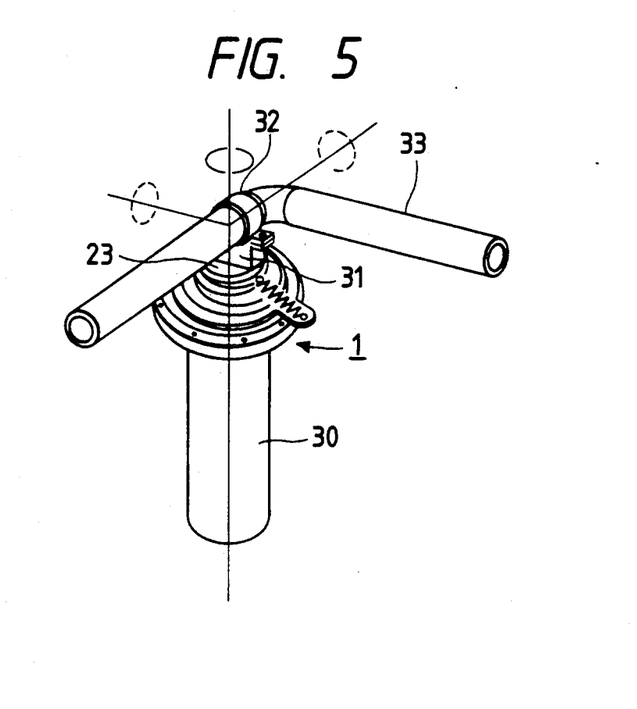
FIG. 5 is a perspective view showing the state in which said multidimensional damping apparatus is applied to vibration prevention of a piping in a plant.
Figure 6:
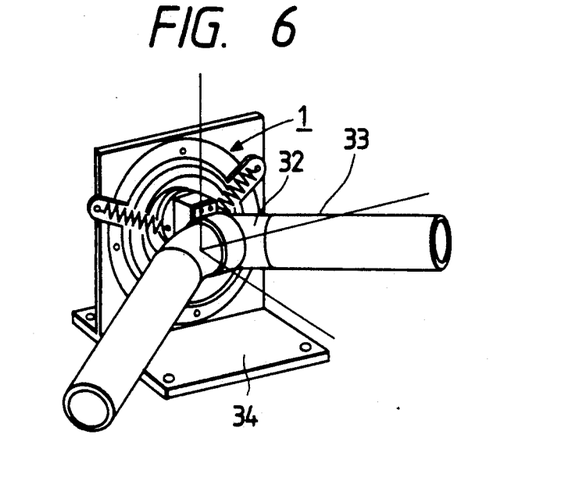
FIG. 6 is a perspective view showing a further applied example in which said multidimensional damping apparatus is applied to vibration prevention of a piping.

FIG. 5 and FIG. 6 show an applied example in which the multidimensional damping apparatus 1 in the aforementioned embodiment is applied to vibration prevention of a lengthy piping in a plant equipment or the like. In these applied examples, a portion in the vicinity of a bent joint which tends to be broken particularly due to vibrations is supported to suppress the vibration of the piping to prevent a breakage from a seam portion, thus preventing a leakage of dangerous liquid or the like. FIG. 5 shows the case where the multidimensional damping apparatus is installed horizontally. The multidimensional damping apparatus 1 is secured to the upper end of a suitable support bed 30, a fixing member 31 for fixedly supporting a piping 33 is mounted on a mounting flange 23 of the output shaft, and the piping 33 connected by a bent joint 32 is secured to and supported on the fixing member 31. FIG. 6 shows the case where the multidimensional damping apparatus is vertically installed on a support bed 34.

The operation of the present embodiment in the applied examples as described above will be described with reference to FIG. 7. First, the fundamental operation of the present apparatus will be described disregarding the function of the magnet spring mechanism and the magnet spring constant adjusting mechanism.

Figure 7:
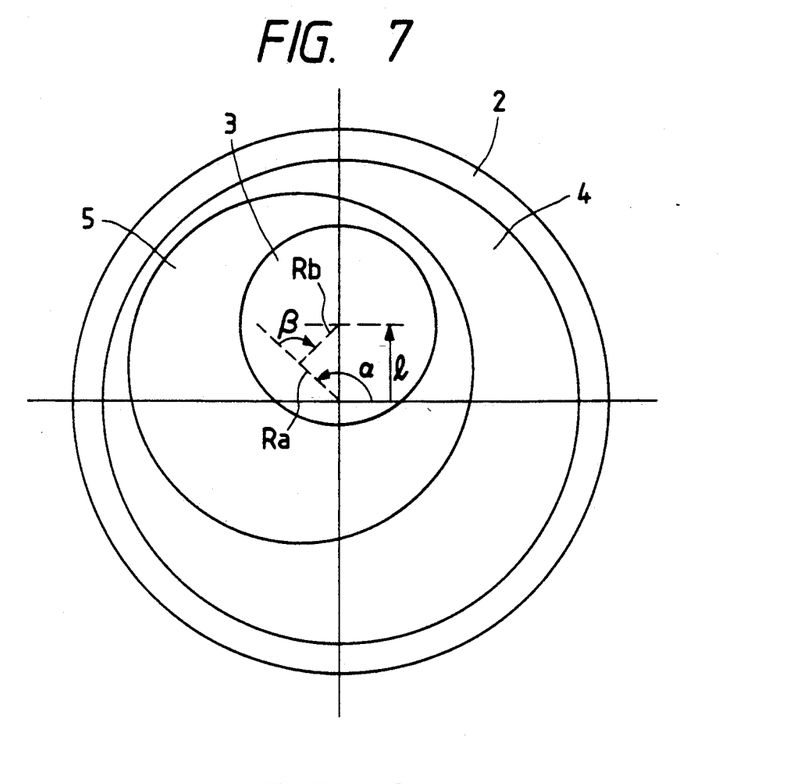
FIG. 7 is an explanatory view of the operating principle of displacement of an output shaft within a two-dimensional plane.

In the multidimensional damping apparatus, since the first eccentric rotor 4, the second eccentric rotor 5 and the output shaft 3 are rotatably supported on the mounting base 2, the first eccentric rotor 4 and the second eccentric rotor 5, respectively, the rotors and the output shaft can be rotated independently. The first eccentric rotor is rotated whereby the center of the second eccentric rotor moves on a circle of which eccentricity La is radius, and the second eccentric rotor is rotated whereby the output shaft moves on a circle of which eccentricity Lb is radius of rotation. Accordingly, the first eccentric rotor 4 and the second eccentric rotor 5 are rotated whereby the center of the output shaft 3 can be moved with respect to the mounting base 2 due to the composite motion thereof from the center of the mounting base to a suitable point within the circle in which La+Lb is radius. That is, the movement of the output shaft 3 from one position to the other is carried out by rotation of each eccentric rotor, and the movement of the output shaft within a two-dimensional plane is converted into rotational motion of the first and second eccentric rotors.

Accordingly, when a two-dimensional force is applied to an object to be vibrationproofed mounted on the output shaft 3, an angular moment is generated since an shaft of each eccentric rotor is eccentric. Each rotor rotates in response to the angular moment to move the output shaft faithfully following the displacing direction of an object to be vibrationproofed. Assume now that when the output shaft 3 moves by a linear distance l from a certain point, the first eccentric rotor 4 rotates by a rotational angle $\alpha$ and the second eccentric rotor 5 rotates by a rotational angle $\beta$. A point on the outer periphery of the first eccentric rotor 4 moves on an arc of Ra·$\alpha$ (Ra represents the radius of the first eccentric rotor), and a point on the outer periphery of the second eccentric rotor 5 moves on an arc of Rb·$\beta$ (Rb represents the radius of the second eccentric rotor). Accordingly, even if the output shaft 3 is finely displaced, the point on the circumference of each eccentric rotor is enlarged by the radius thereof so that a large displacement takes place and a displacement at high speed takes place. This is very advantageous in that the change in magnetic flux of the magnet spring mechanism is increased to enhance the damping force as will be described later and brings forth the effect in that an object to be vibrationproofed can be restored with an extremely small force.

Figure 8:
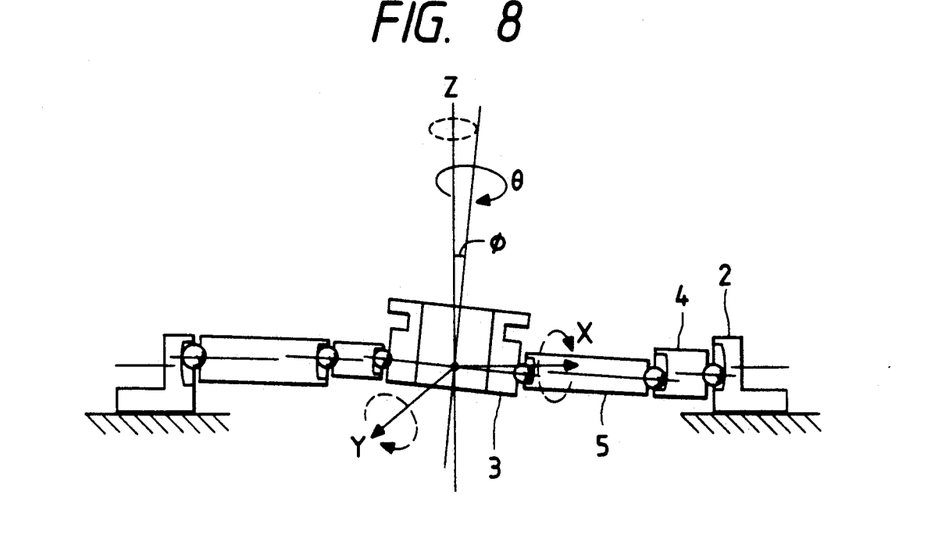
FIG. 8 is a schematic longitudinal sectional view for explanation of operation of the multidimensional damping apparatus.

In the present embodiment, the eccentric rotors and the output shaft are respectively supported by the self-aligning bearing 12, and the eccentric rotors and the output shaft can be freely rotated and can be tilted in a predetermined range with respect to the respective supports. Therefore, the output shaft 3 is tiltable in the range to which is added a tilting range of the self-aligning bearing of each stage and can easily follow even if an object to be vibrationproofed is vibrated with respect to a plane at an angle of $\phi$ as shown in FIG. 8. In addition, since the output shaft 3 can be rotated about the axis with respect to the second eccentric rotor 5, it can follow even a torsional vibration of an object to be vibrationproofed.

Accordingly, according to the apparatus of the present embodiment, the output shaft 3 can easily follow the two-dimensional vibration within the plane, the torsional vibration, the inclining vibration and the composite vibration thereof, and can respond to the multidimensional vibration.

Next, the function of the magnet spring mechanism will be described.

Figure 9:
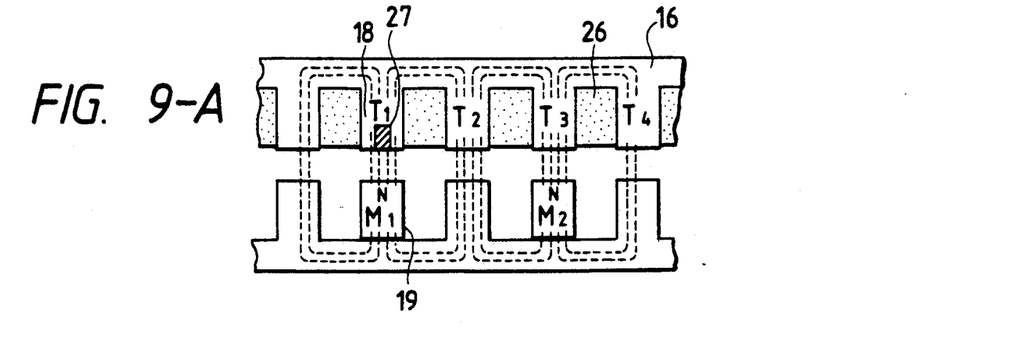
Figure 10:
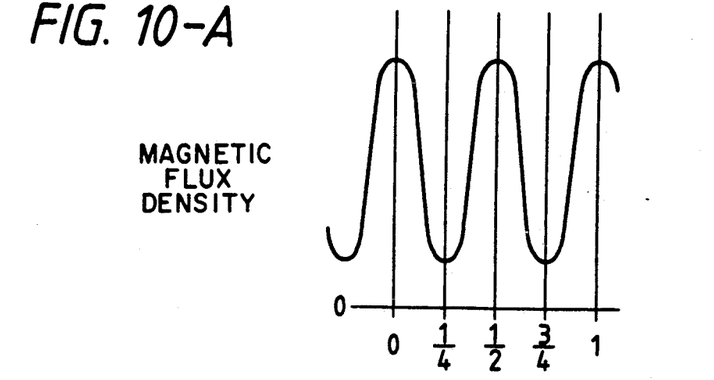

The output shaft 3 and the eccentric rotors 4 and 5 are rotated and displaced with respect to the mounting base 2 on which the eccentric rotors are supported and the eccentric rotors. Then the pulse-like braking torque is generated in the rotors due to an eddy current loss within a stator caused by magnetic flux formed by the permanent magnet 19 on the rotor side, and the magnet spring mechanism 15 exhibits the function as a damper. When the state in which the permanent magnet 19 is opposed to the pole teeth 18 is zero, as shown in FIG. 9-A, a braking torque is generated as the rotor rotates from that state, and it becomes maximum in the state in which the rotor is deviated by ¼ pitch of the pole teeth, as shown in FIG. 9-B. When the rotor further rotates, the braking torque is zero at a point deviated by 2/4 pitch from an expected position. A braking torque reversed to the former is maximum at a point deviated by ¾. FIG. 10-A shows the magnetic flux density with respect to a deviation of phase between the rotor and the stator in the magnet spring mechanism; and FIG. 10-B shows the change of the magnetic flux density in that case.

The larger the change of the magnetic flux density, the larger braking torque of the magnet spring occurs. In the case of the present invention, since the vibration of an object to be vibrationproofed is converted into rotational motion of the eccentric rotors 4 and 5, a large rotational angle and rotational speed of the rotor occur even in a fine vibration. As a result, the change of the magnetic flux density becomes large to produce a large braking torque so that braking of a fine vibration can be effectively attained. Further, since a large pitch between magnets can be employed, arrangement of magnets or the like is easy, thus enabling reduction in manufacturing cost.

On the other hand, since the composite vibrationproof adjusting spring 6 always acts to restore the output shaft 3 to its initial position, in the case where the eccentric rotors 4 and 5 generate large vibrations so as to produce rotation over several teeth portions of the magnet spring, the composite vibrationproof adjusting spring 6 effectively acts to suppress the vibration of the output shaft 3 to restore the same to its initial position. In this case, when the retaining force of the magnet spring is strong, the actuator 21 is automatically actuated, and magnetism is shielded as shown in FIG. 9-C and FIG. 9-D by inserting the magnetic shield plate 20 into the gap to weaken the braking torque. The output shaft can be promptly restored to its initial position by the force of the composite vibrationproof adjusting spring 6. In the present embodiment, since the rotational angle detection sensor 27 is provided on the stator side, when the rotor rotates, the step signal is generated. The insertion of the shield plate is controlled from the number of step signals and time intervals of step signals. The actuator is actuated in a moment a large disturbance (vibration) is applied to the output shaft and the rotor is greatly rotated, and the magnetic shield plate is inserted to shield magnetism. Thus the output shaft is promptly returned to its initial position.

Figure 11:
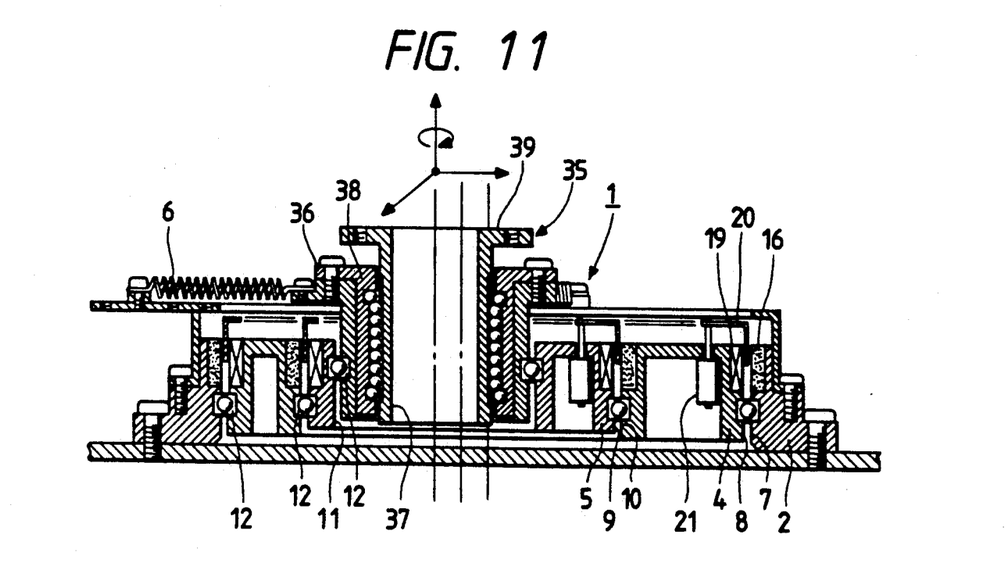
FIG. 11 is a longitudinal sectional view of a further embodiment of a multidimensional damping apparatus according to the present invention.

FIG. 11 shows another embodiment of the present invention in which a construction of an output shaft is modified. In this embodiment, an output shaft 35 is composed of a spring support rotor 36 and a mounting shaft 37 having a mounting flange 39. The spring support rotor 36 is rotatably fitted in and supported on the second eccentric rotor 5 through an self-aligning bearing 12, and the mounting shaft 37 is axially movably fitted in the spring support rotor 36 through a linear bearing 38. Other structures are similar to those described in the previous embodiment, and the same reference numerals as those used in the previous embodiment are used. According to this embodiment, there can respond to a composite vibration accompanied by an axial displacement in addition to movement of the output shaft in the previous embodiment.

Figure 12:
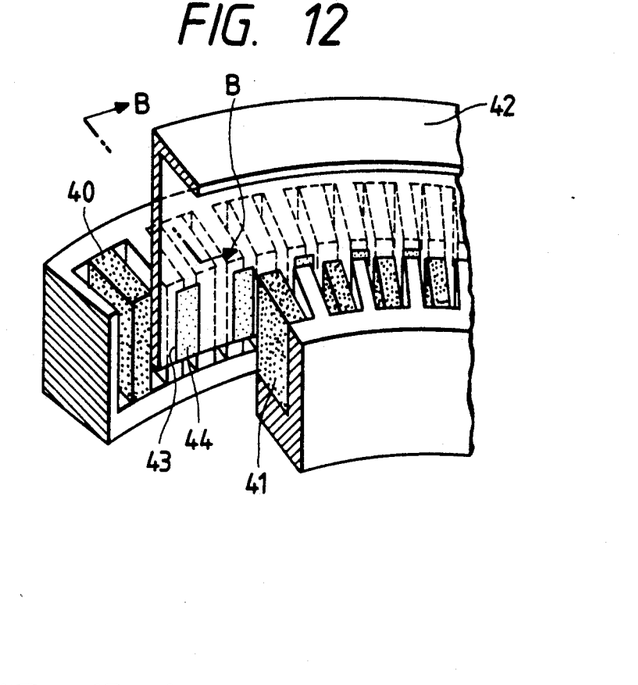
FIG. 12 is a perspective view of another embodiment of a magnet spring mechanism.
Figure 13:
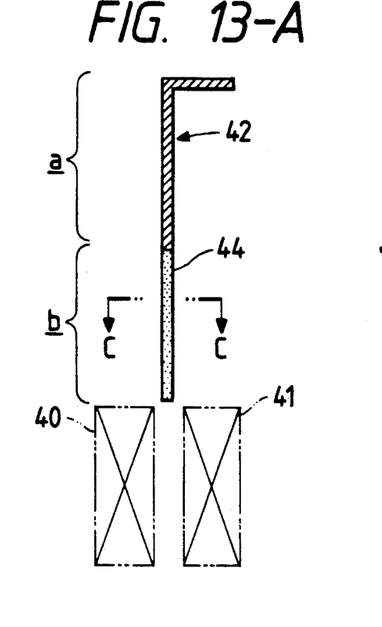
Figure 14:
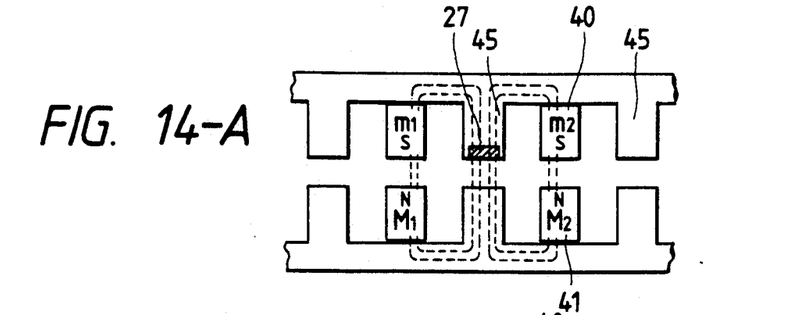

FIGS. 12 to 14 show another embodiment of a magnet spring mechanism portion.

In this embodiment, permanent magnets 40 are provided also in a stator portion so that they are opposed at equal pitch to permanent magnets 41 on the rotor side. A shield plate 42 made of a high permeability material is formed to have a height about twice of the height of the permanent magnet, and a slit 43 is provided at a lower half portion thereof (a portion b in FIG. 13-A) so as to be positioned between pitches of the permanent magnet to form a block opposed to the magnet. A good conductor material 44 such as copper is mounted in the slit to short-circuit them. Thereby, an eddy current is short-circuited to produce a damping force.

The shield plate 42 can be moved up and down by the actuator so as to assume a state in which the shield plate 42 is completely at an up position as shown in FIG. 13-A with respect to a gap between permanent magnets not at all to influence on the magnetic flux, a state in which the shield plate 42 is at an intermediate position and the lower half portion b formed with a slit is positioned, a state in which the upper half portion a is positioned, and a state in which a suitable intermediate region therebetween is positioned. While in the aforementioned structure, the shield plate is controlled to be selected in position according to the form of vibrations of an object to be vibrationproofed, it is to be noted that the shield plate is usually in a state in which the shield plate is completely at an up position not at all to influence on the magnetic flux or a state in which the lower half portion b is positioned.

In the state in which the shield plate is completely at an up position, the shield plate does not influence on the rotation of the rotor. The magnetic flux density is maximum and stablized in the state in which the permanent magnet 40 on the stator side is opposed to the permanent magnet 41 on the rotor side as shown in FIG. 14-A by the magnetic flux formed by the permanent magnets on the rotor and stator sides. A vibration occurs, and the rotor rotates from that state and positions of the stator and rotor are deviated. Then the braking torque for restoration to the stable state is generated. The magnetic flux density is minimum in the state in which the rotor is deviated by ¼ pitch as shown in FIG. 14-B, and therefore the maximum braking torque is generated. When the rotor further rotates and is deviated by ½ pitch or more from an expected position, a braking torque reversed to the former is generated and the rotor is intended to be stabilized at the state deviated by one pitch.

Figure 15:
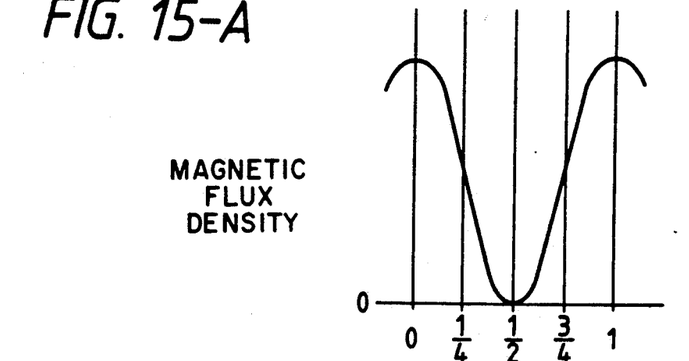

FIG. 15-A shows the relationship between a deviation of phase between the rotor and the stator and the magnetic flux density in the spring mechanism; and FIG. 15-B shows the derivative of the magnetic flux density in that case. In the case of the present embodiment, the change of the magnetic flux density is determined merely by the pitch of the magnet, and therefore, this is effective for vibrationproof of vibrations having an amplitude within ½ pitch between magnets. Since permanent magnets are provided on both stator and rotor sides, a large braking torque can be generated.

In the state in which the lower half portion b is positioned between the magnets (FIG. 14-C), since the good conductor material 44 is provided in the slit 43 of the shield plate, the change of the magnetic flux density is sharper than that of the aforementioned case so that the braking torque caused by an eddy current increases, and the damping effect increases. Accordingly, in this case, since better vibrationproof effect of fine vibrations than the aforementioned case is obtained, this is advantageous for vibrationproof of machine tools or the like accompanied by a small amplitude.

In the state in which the upper half portion a is positioned between the magnets (FIG. 14-E), a ring-like high permeability material without a slit is positioned in a gap, and therefore, magnetic forces on the stator and rotor sides are cut off and the restoring force caused by the magnetic force is small. Accordingly, in the case where the amplitude of an object to be vibrationproofed is large, this state is used whereby the braking torque caused by the magnetic force is cut off, and the rotor can be promptly returned to its initial position by the composite vibrationproof adjusting spring mechanism provided between the output shaft and the fixed base.

Accordingly, according to the present apparatus, employment can be made of a method for vibrationproof by a combination of a state of being normally completely at an up position and a state in which the upper half portion a is positioned when a large vibration occurs, a method of a combination of a state in which normally the lower half portion b is positioned between magnets and a state in which in the case where a large vibration occurs, the upper half portion a is positioned, a method of a combination of a state of being normally completely at an up position, a state in which the lower half portion b is positioned according to uses and a state in which in the case where a large vibration occurs, the upper half portion is positioned, and a method in which an intermediate state is selected to adjust a braking torque. A methof for obtaining the highest damping effect according to vibrations can be selected. The combination of the state in which the shield plate is completely at an up position and the state in which the upper half portion is positioned is suitable for the case where a relatively large amplitude involves since the change of the magnetic flux density is determined merely by the pitch between the magnets. The combination of the state in which the lower half portion is positioned and the state of being completely at an up position is suitable for the case where a fine vibration occurs since the change of the magnetic flux density is sharp and the braking torque increases. The combination of the completely up state, the state in which the lower half portion is positioned, and the state in which the upper half portion is positioned is suitable for the case of from a large amplitude to a fine amplitude.

Figure 16:
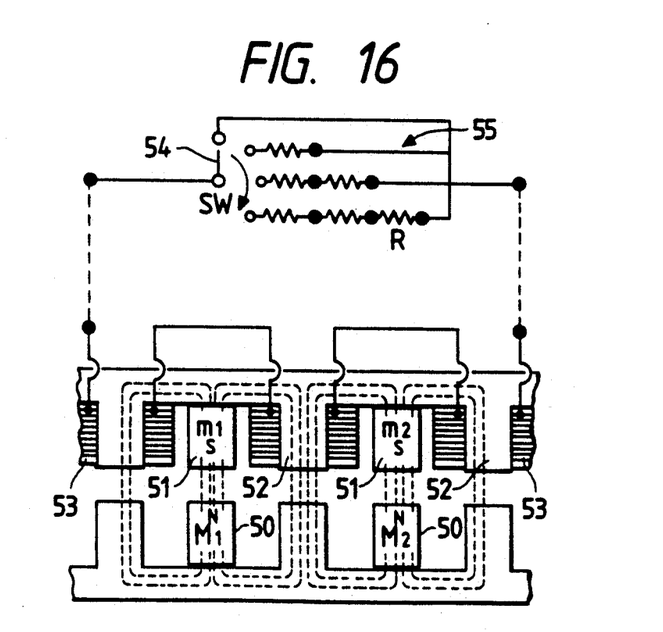
FIG. 16 is a schematic view still another embodiment of the magnet spring mechanism.

FIG. 16 shows still another embodiment of a magnet spring mechanism.

In the present embodiment, permanent magnets 51 are arranged on the rotor side in correspondence to permanent magnets 50 on the stator side, and a coil 53 is wound on a magnetic member 52 between the permanent magnets. These coils are connected, and a load 55 different in resistance is selected by a switch 54 and connected between terminals thereof. An induction electromotive force generated when the magnetic flux density changes due to the displacement of the rotor is converted into heat by an adjustable load and radiated to enhance the braking torque. Other structures are similar to those described in the embodiment shown in FIGS. 12 to 15 and detailed description thereof will be omitted. It is to be noted that a conductor may be wound on a magnetic member in a ring-like manner without connecting a load instead of a configuration that the conductor is wound in a coil-like manner.

While variious embodiments of the present invention have been explained, it is to be noted that this multidimensional damping apparatus can be variously changed in design. For example, the eccentric rotors are not always limited to two stages but more than two stages may be employed. While in the embodiments shown, the eccentric rotors and output shaft have been of the internally-inserted type, it is to be noted that a laminated type in which the eccentric rotors and output shaft are vertically arranged may be employed. Furthermore, while in the above-described embodiments, a self-aligning bearing has been employed as a bearing so as to respond to vibration having an angle with respect to a plane, it is to be noted that an ordinary ball bearing or other bearings may be suitably employed. Moreover, the magnet spring mechanism may be provided between the second eccentric rotor and the bearing. A magnet is not always limited to a permanent magnet but an electromagnet may be employed. The form of the magnet spring mechanism is not limited to those described in the above-described embodiments but various modifications may be taken into consideration. For example, while in the embodiments shown in FIGS. 3 and 4, a good conductor has been embedded into a slit, it is to be noted that a good conductor may be laminated on the inner peripheral surface of a stator in a ring-like manner. Similarly, a good conductor for the shield plate shown in FIGS. 12 and 13 may be continuously laminated on the inner peripheral surface of the shield plate. Further, in the embodiments shown in FIGS. 12 and 13, a good conductor may be arranged in a slit between magnets on the stator side or rotor side. In addition, a combination of a magnet spring mechanism and a magnetic shield plate may be suitably selected.

On the other hand, the multidimensional damping apparatus according to the present invention can be applied to various uses such as vibrationproof for buildings such as experimental rooms, various structures and equipment other than the damping apparatus for pipings as described above. Particularly, in the damping apparatus according to the present invention, an object to be vibrationproofed can be supported extending through a hollow portion of the output shaft, and it can be used as a self-aligning shaft of a rotational shaft.

Furthermore, the multidimensional damping apparatus may be axially divided into two or more and assembled. Thereby, an object to be vibrationproofed can be mounted in a hollow portion of the output shaft without removing it.

What is claimed is:

1. A multidimensional damping apparatus having a fixed base and an output shaft for mounting an object to be vibrationproofed, comprising: a plurality of eccentric rotors rotatably fitted through bearings between said fixed base and said output shaft, said output shaft being capable of effecting free displacement within at least a two-dimensional plane with respect to said fixed base and free rotation about an axis, magnet spring mechanisms provided on opposed fitted wall surfaces between said fixed base and a first one of said eccentric rotors and between said first eccentric rotor and a second one of said eccentric rotors, a composite vibrationproof adjusting spring provided between said fixed base and an object to be vibrationproofed, and the output shaft is braked so as to restore the output shaft to its initial position by said magnet spring mechanisms and said composite vibrationproof adjusting spring mechanism with respect to the displacement of said output shaft.

2. A multidimensional damping apparatus according to claim 1, wherein said bearing is a self-aligning bearing.

3. A multidimensional damping apparatus according to claim 1 or 2, wherein said output shaft is composed of a spring-supported rotor and a mounting shaft fitted in and supported on said spring-supported rotor through a linear bearing.

4. A multidimensional damping apparatus according to claim 1, wherein at least one of said magnet spring mechanisms is provided on one of a stator side and a rotor side with a high permeability pole-tooth type ring formed of a high permeability material and permanent magnets at equal pitch opposed to pole teeth of said high permeability pole-tooth type ring are arranged in a ring-like manner on the other of said stator side and said rotor side.

5. A multidimensional damping apparatus according to claim 4, wherein a good conductor is arranged between said pole teeth.

6. A multidimensional damping apparatus according to claim 1, wherein magnets of said magnet spring mechanisms are arranged on a stator side and on a rotor side opposed to said stator side at equal pitch relative to each other so that permanent magnets are opposed in different poles.

7. A multidimensional damping apparatus according to claim 6, wherein between the permanent magnets on one of a stator side and a rotor side is arranged an electromagnetic coil having a magnetic material positioned between said permanent magnets as a core, and a load is connected to said coil so that the load can be switched and adjusted.

8. A multidimensional damping apparatus according to claim 4, 5, 6 or 7, wherein said magnet spring mechanism has a magnet spring constant adjusting mechanism provided with a ring-like magnetic shield plate so that the latter can be moved in and out of a gap portion between the stator and the rotor so as to suitably adjust the spring constant.

9. A multidimensional damping apparatus according to claim 8, wherein said magnet spring constant adjusting mechanism has a ring-like magnetic shield plate which has a height about at least twice the height of the permanent magnets provided on said one of a stator side and a rotor side, which is formed of a high permeability material and in which a narrow good conductor is arranged on the lower half portion thereof with a phase deviated from the magnet pitch so as to be positioned between the permanent magnets, said ring-like magnetic shield plate being movable upward and downward.

10. A multidimensional damping apparatus according to claim 8, wherein a rotational angle detection sensor is mounted on the stator side opposed to the permanent magnets on the rotor side of said magnetic spring mechanism, and the vertical movement of said magnetic shield plate is controlled by an output of said rotational angle detection sensor.

11. A multidimensional damping apparatus according to claim 1, wherein said fixed base, said eccentric rotors, said output shaft and said magnet spring mechanisms are axially divided into at least two and assembled.

* * * * *